No. 751,203. Patented February 2, 1904.

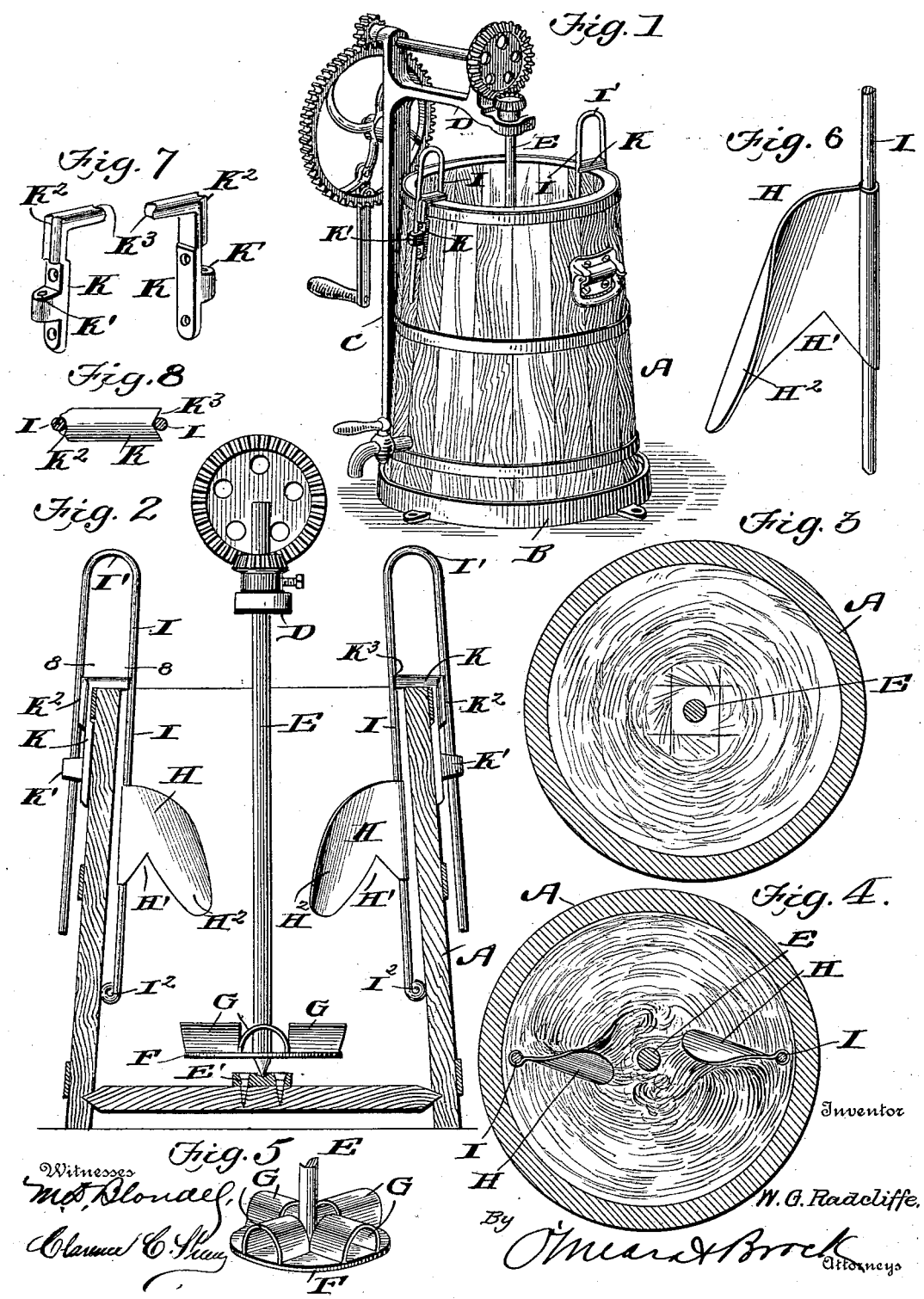

UNITED STATES PATENT OFFICE.

WILLIAM GEO. RADCLIFFE, OF PETERSBURG, VIRGINIA.

CHURN.

SPECIFICATION forming part of Letters Patent No. 751,203, dated February 2, 1904.

Application filed March 14, 1903. Serial No. 147,771. (No model.)

*To all whom it may concern:*

Be it known that I, WILLIAM GEO. RADCLIFFE, a citizen of the United States, residing at Petersburg, in the county of Dinwiddie and State of Virginia, have invented a new and useful Churn, of which the following is a specification.

This invention relates generally to churns, and more particularly to that class thereof in which a rapid and continuous current of air is taken into and forced through the milk, thereby liberating the butter globules from the milk or casein and purifying the milk and butter or any other liquid through aeration and agitation instead of by beating or breaking, as commonly occurs in the ordinary construction of reciprocating or rotary churn.

The object of my invention is to provide a cheap, simple, and efficient construction of churn operating upon the principle just referred to, which will be exceedingly easy and rapid in operation and also one which can be adjusted according to circumstances.

Another prime object of the invention is to use as few mechanical contrivances as possible for passing a current of air into the milk and to make use of the natural vortexes produced by the simple means hereinafter described as the method for operating the principle of aeration before referred to, thus making a cheap and simple construction.

Another object of the invention is to provide a device which can be used as a churn or as a device for aerating and purifying milk or any other liquid.

Another object of the invention is to provide a device of this kind which can be quickly and easily cleaned.

With these objects in view the invention consists, essentially, in the employment of a cylindrical-shaped churn-body in which is mounted a solid rotary shaft carrying a flat disk provided with a plurality of tubes or channels arranged thereon, said tubes or channels being open at both ends, whereby as the shaft is rotated the milk will be drawn down into the vortexes, together with a certain quantity of air, thereby thoroughly aerating and simultaneously separating the butter particles from the milk.

The invention consists also in the employment of one or more deflector blades or wings, whereby a definite quantity of the milk is deflected or turned back into the vortexes, thereby accomplishing the aeration and churning operation in much less time than it would be accomplished without the use of deflector blades or wings.

The invention also consists in making said deflector-blades adjustable, and the invention still further consists in certain details of construction hereinafter fully described, and pointed out in the claims.

In the drawings forming part of this specification, Figure 1 is a perspective view of a churn constructed in accordance with my invention. Fig. 2 is a vertical sectional view of the same, the dasher and deflectors being shown in elevation. Fig. 3 is a horizontal sectional view showing the vortexes formed by the rotation of the dasher. Fig. 4 is a horizontal sectional view showing the operation of the deflectors in connection with the dasher. Fig. 5 is a detail perspective view of the dasher. Fig. 6 is a detail perspective view of one of the deflectors. Fig. 7 is a detail perspective view of the guiding-brackets. Fig. 8 is a detail sectional view on the line 8 8 of Fig. 2.

In carrying out my invention I employ a churn-body A, preferably cylindrical in form and constructed of wood, although it will be understood that any other suitable material may be employed. This churn-body is arranged upon any suitable construction of base B, to which is attached a standard C, carrying a horizontal bracket-arm D, at the outer end of which is journaled the dasher-shaft E, said dasher-shaft being rotated by any suitable construction of driving mechanism, the mechanism shown in the accompanying drawings being that employed at the present time; but it will of course be understood that other forms of driving mechanism may be employed, if so desired. The lower end of the dasher-shaft E rests in a bearing E'; but this is not absolutely essential. A flat circular disk F is rigidly connected to the solid shaft E, adjacent to the lower end thereof, and arranged upon the upper face of said disk are abutments, as the tubes or channels G, which extend from the outer edge of the disk to points adjacent to the center thereof; but it will be noted that the said tubes or channels do not extend entirely to the shaft E, but are open at both ends, as most clearly shown in Figs. 2 and 5. By rotating the shaft E in either direction the milk within the churn-body will be instantly drawn down into the vortexes created by suction induced by the operation of the dasher, and as the milk whirls around in the churn this vortex is maintained, drawing down into the milk a quantity of air which commingling with the milk not only aerates the same, but also separates the butter particles from the milk or casein and quickly and easily produces butter of granular quality. In order to expedite the churning operation, I propose to turn back a limited quantity of the milk into the vortexes, and this I accomplish by means of the deflector blades or wings H, which are essentially in the form of curved blades notched along their lower edges, as shown at H', and having downwardly-extending longitudinally-curved portions H². The blades or wings are connected to rods I, which extend substantially parallel with the inner face of the churn-body and extend upwardly a short distance above the top of the churn and are then bent back upon themselves into an inverted-U shape, as shown at I'. Brackets K are secured to the top of the churn-body, each of which is provided with an eye K' and has its upper end grooved, as at K² and K³, and overhangs the top of the body. The legs of the rods or clamps I straddle the respective brackets, with a leg in each grooved portion, and the outer leg projects through the eye K'. A deflector is rigidly secured to each inner leg and projects substantially radially inward when in position in the churn. The positions of the deflectors within the churn can be regulated by moving the rods up or down, as desired.

In practice it is desirable to only partially submerge the deflectors in the milk, and it is therefore necessary to have said deflectors adjustable, so that their positions can be regulated in accordance with the amount of milk being operated upon. The lower ends of the rods I within the churn-body are turned, as shown at I², so that the rods are held a short distance away from the sides of the churn-body, thereby permitting a certain quantity of the milk to pass freely around the churn-body, and consequently reducing the friction, thus contributing to the ease of operation of the churn. When the deflectors are used in connection with the dasher, a portion of the milk is turned back by each deflector into the main or prime vortex, and each deflector produces a separate and distinct subvortex which instantly carries down additional currents of air into the body of the milk, thereby aerating and separating the butter from the milk much quicker than could be accomplished were the deflectors not employed. These deflectors do not serve as brakes or stops, but are intended to gradually and evenly turn backwardly and downwardly a limited portion of the milk, said portion being regulated according to the capacity of the dasher for drawing the same downward into the vortex and aerating and agitating the same. The exact position of the deflectors can be quickly and easily ascertained and the maximum capacity of the churn readily gaged. The dasher-shaft being solid and the dasher proper consisting only of a flat disk and open-ended tubes or channels, the device can be kept thoroughly clean at all times.

Thus it will be seen that I provide an exceedingly cheap, simple, and durable churn of the kind described, which will successfully perform all of the functions hereinbefore referred to.

Having thus fully described my invention, what I claim as new, and desire to secure by Letters Patent, is—

1. In a churn, a body, a rotary shaft therein, radially-arranged abutments at the lower end of the shaft, U-shaped rods movably mounted on the sides of the body, the inner leg of each of which is provided with a radially-arranged deflector, and means for holding and guiding said rods in a vertical position.

2. In a churn, a body, a rotary dasher therein, radially-arranged abutments at the lower end of the shaft, brackets at the upper edge of the body, each of which is provided with an eye and has its upper end extending over the top of the body and is grooved, a U-shaped rod in each bracket, the legs of which enter the grooved portions and the outer leg passes through said eye, and a deflector rigidly secured to the inner leg.

3. In a churn of the kind described, a churn-body, having guiding-brackets connected thereto, rods carried by said guiding-brackets, the curved deflectors connected to said rods, the lower ends of the rods being turned as described whereby the inner members of the rods are held away from the sides of the churn-body, for the purpose set forth.

WILLIAM GEO. RADCLIFFE.

Witnesses:
R. B. SHELBURN,
W. L. MORTON.